S. S. EVELAND.
ANNULAR ROLLER BEARING.
APPLICATION FILED AUG. 5, 1908.

992,949.

Patented May 23, 1911.

WITNESSES:

INVENTOR
Samuel S. Eveland
BY
Augustus B. Stoughton
ATTORNEY.

UNITED STATES PATENT OFFICE.

SAMUEL S. EVELAND, OF PHILADELPHIA, PENNSYLVANIA, ASSIGNOR TO STANDARD ROLLER BEARING COMPANY, OF PHILADELPHIA, PENNSYLVANIA, A CORPORATION OF NEW JERSEY.

ANNULAR ROLLER-BEARING.

992,949.

Specification of Letters Patent.  Patented May 23, 1911.

Application filed August 5, 1908. Serial No. 447,037.

*To all whom it may concern:*

Be it known that I, SAMUEL S. EVELAND, a citizen of the United States, residing at the city of Philadelphia, in the county of Philadelphia and State of Pennsylvania, have invented certain new and useful Improvements in Annular Roller-Bearings, of which the following is a specification.

So-called annular ball bearings by reason of their convenient size and shape are extensively used but under certain circumstances, as where subjected to relatively severe end thrust, they have frequently failed and proved unsatisfactory.

One object of the present invention is to provide an annular roller bearing adapted as to size and shape for replacing annular ball bearings and which shall be satisfactory, durable and efficient under all circumstances of use even when exposed to relatively severe end thrust.

The invention will be claimd at the end hereof but will be first described in connection with the embodiment of it chosen for illustration in the accompanying drawings in which—

Figure 1:
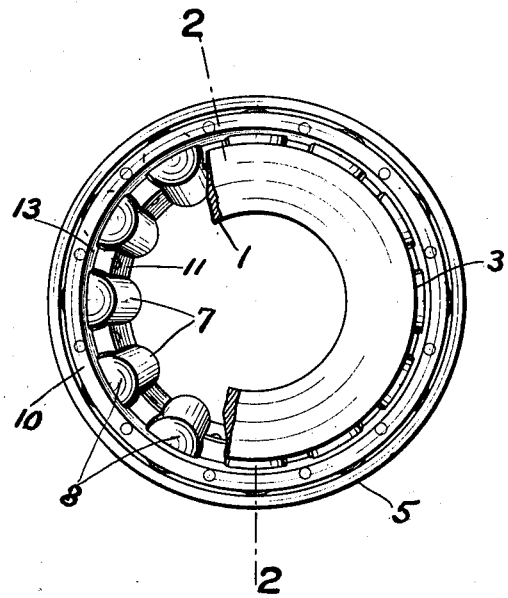
Figure 2:
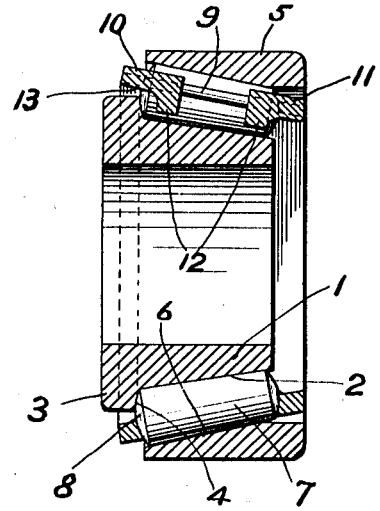
Figure 3:
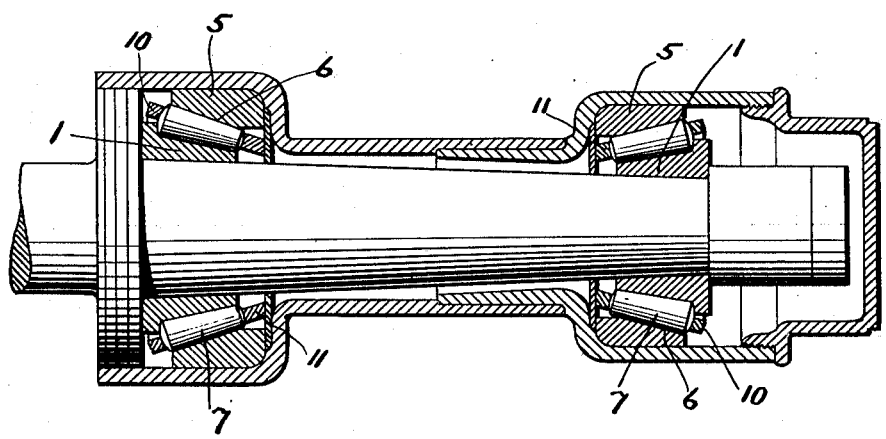

Figure 1, is an end view of an annular roller bearing embodying features of the invention and having a portion of the inner ring removed. Fig. 2, is a central sectional view taken on the line 2—2, of Fig. 1, and Fig. 3, is a sectional view showing two of the annular roller bearings operatively arranged.

In the drawings 1, is an inner ring provided externally with a conical roller race surface 2, and an inner edge with an outwardly projecting flange 3, having an outwardly beveled abutment or working side 4, the purpose and function of which will be hereinafter described.

5, is an outer ring concentric with the inner ring and provided internally with a conical roller race surface 6.

7, are conical rollers arranged between the races and having their larger ends chamfered to conform to and ride on the outwardly beveled working side of the flange which extends well out over the larger ends of the rollers. End thrust is referred to the outwardly beveled side 4, of the flange 3, and the ends 8, of the rollers and to the conical surface 6, and the faces of the rollers according to the direction of the thrust. The described construction is well adapted to resist such thrust.

There is a cage consisting of connecting rods 9, and of large and small conical rings 10 and 11, each having confronting projections 12, provided with concave side walls constituting roller pockets. The ring 10, is internally cut away or rabbeted as at 13, to expose the larger ends of the rollers and receive the flange 3, on the inner cone.

The roller bearing as a whole is compact and adapted for use interchangeably with so-called annular ball bearings, its rollers are free in the sense that they are not mounted on pivot pins, and its construction is such that it is well adapted to resist end thrust without undue friction or grinding while at the same time to act as a radial thrust bearing.

What I claim is:

An annular roller bearing comprising an inner ring provided with a conical roller race surface and at one edge with an outwardly projecting flange having an outwardly beveled abutment or working side, an outer ring concentric with the inner ring and provided internally with a conical roller race surface, conical rollers arranged between the races and having their larger ends chamfered to conform to and ride on the outwardly beveled working side of the flange, and a cage consisting of connecting rods and of large and small conical rings each having confronting projections provided with conical side walls constituting roller pockets and the larger end ring being internally cut away or rabbeted to expose the larger ends of the rollers and receive the flange on the inner cone.

In testimony whereof I have hereunto signed my name.

SAMUEL S. EVELAND.

Witnesses:
K. M. GILLIGON,
G. E. MORGAN.